Dec. 18, 1956  W. B. KENICK  2,774,843
SENSITIVE RELAY
Filed Feb. 17, 1953

INVENTOR.
Walter B. Kenick,
BY
Cromwell, Greist & Warden
ATTYS.

United States Patent Office 2,774,843
Patented Dec. 18, 1956

2,774,843

SENSITIVE RELAY

Walter B. Kenick, Skokie, Ill., assignor to W. M. Welch Manufacturing Company, Chicago, Ill., a corporation of Illinois Application February 17, 1953, Serial No. 337,360

4 Claims. (Cl. 200—110)

The present invention relates to improvements in a sensitive relay such as is commonly employed to control an electrical circuit in response to potential changes in another electrical circuit, ordinarily of small magnitude.

A well known type of sensitive relay consists of a permanent magnet, between opposed pole pieces of which an armature is mounted to rotate, a coil on the armature being wired to a circuit to which the relay responds in controlling another circuit. A contact finger or pointer is secured to the armature and is swung in an arc between a pair of fixed magnetic contacts, upon rotation of the armature when a current flows in its coil. The contact finger is equipped at its end with a small piece of magnetic material such as soft iron, the magnetic field of the fixed contacts assisting or expediting the making of an electrical contact by the finger, once the latter has been shifted from a neutral center position. When slightly displaced from this position, the arm pulls very rapidly to right or left to make the indicated contact.

The entire field of the permanent magnet has a very disturbing effect upon the much weaker magnetic contact field; and, accordingly, provision is usually made to counteract the same by shielding. However, a desirably strong magnetic field in the meter movement has the disturbing effect referred to, in a compact small relay, regardless of the best known means of shielding employed; consequently, a definite limitation is imposed upon the strength of a usable permanent magnet in the meter movement of the relay. Alternatively, and as is usually the case, it is necessary to manufacture the meter movement by employing a magnet therein which is of limited strength. This in turn forces the use of lighter torque springs controlling the movement of the armature, thereby imposing upon the manufacturer the need for practically frictionless movement mountings in a very perfectly balanced moving armature system, in order to achieve uniform response to minute currents. It will therefore be appreciated that the manufacture of the instrument is very exacting and high in cost.

It is a particular object of the invention to provide an improved sensitive relay featuring a movable contact arm coacting with one or more fixed contacts in response to minute potential changes in a primary electrical circuit, which is assisted in making electrical contact in a secondary electrical circuit by means of magnetic attraction between the contact and the contact arm, as described above, in which the magnetic field between the contact points and the movable contact arm is protected by improved means from magnetic interference by the stronger magnetic field of the main meter movement, said main meter movement being responsive to potential changes of the primary electrical circuit.

More specifically, it is an object to provide a relay construction as described, in which the end of eliminating magnetic interference at the contact field is attained simply and inexpensively by employing for the main magnetic field for the relay armature a pair of permanent bar magnets, rather than the customary one-piece permanent magnet, and by bridging the ends of these magnets remote from the armature and magnet pole pieces with a cross bar of highly permeable magnetic material such as soft iron, thereby to confine the effect of the field of the meter movement magnet in a predetermined area, from which the small magnetic contact field is rendered impervious by a magnetic shield.

Generally, the purposes which are served by the invention are to provide an improved sensitive relay which (a) permits the use of a stronger magnetic field in the meter movement; (b) permits the use of stronger springs, having a torque-weight ratio of greater than unity; (c) reduces the need for perfect balance of the relay's moving parts; and (d) reduces the need for the attainment of practically complete freedom from friction of the relay's moving parts, in order to get acceptable operation despite the disturbing magnetic effect referred to above. All of these factors combine to provide a relay of more sturdy construction and more reliable operation.

A single embodiment of the invention is presented herein for purpose of illustration, yet it will be appreciated that the invention may be incorporated in other modified forms coming equally within the scope of the appended claims.

Figure 1:
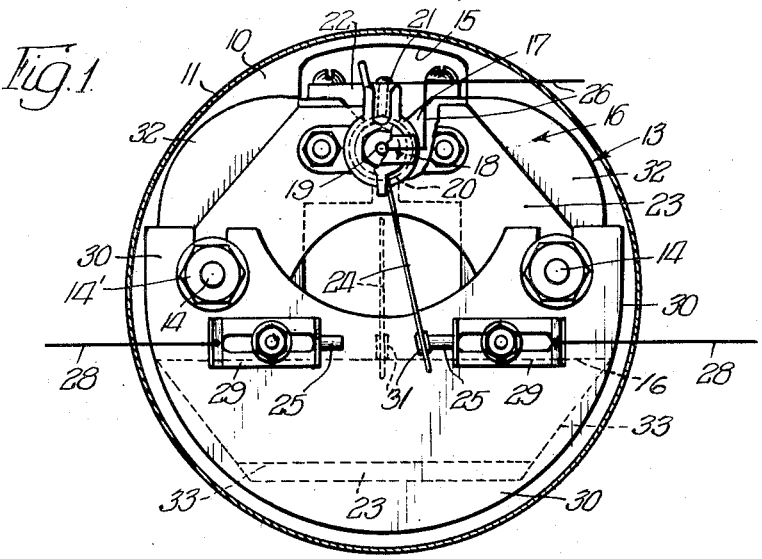
Fig. 1 is a front view of a sensitive relay in accordance with the invention, the external casing of the instrument being sectioned along a line corresponding to line 1—1 of Fig. 2, being partially broken away to show a detail of the meter movement.

Referring to the drawing, the relay structure is housed in a suitable casing made up of a rear circular mounting plate 10 of a suitable insulating material and a cylindrical housing 11 having an integral circular front wall 12. The mounting plate and housing front wall are apertured for the reception of mounting studs 14, on which the relay proper, generally designated 13, is assembled and by which the same is fixedly secured within the housing. The inner surface of plate 10 is provided with a suitable, generally rectangular recess 15 to accommodate certain parts of the unit 13.

Figure 3:
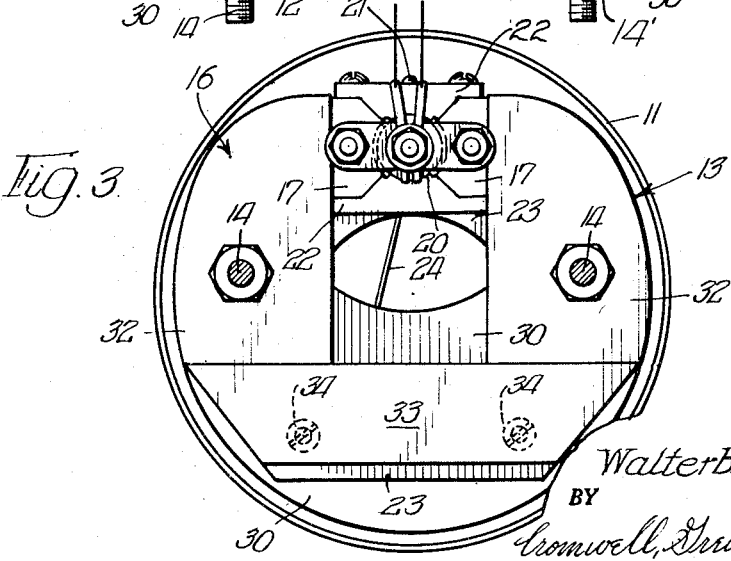
Fig. 3 is a fragmentary view in rear elevation, with the casing sectioned as along line 3—3 of Fig. 2.

In accordance with generally conventional design, relay 13 comprises a permanent magnet unit 16 presenting opposed arcuate pole pieces 17 between which the coil wound armature 18 swings on a delicately journaled shaft 19. The coil winding of this armature is supplied in a fashion well known to the art through a pair of leads (see Fig. 3) which may be connected to the coil through a pair of light torsion springs by which the armature is normally held in a neutral position. Specific provisions of this sort have not been illustrated in the interest of simplifying the drawing, and for the further reason that the provisions in question form no part of the particular invention. Armature 18 swings about a fixed cylindrical core 20, which is fixedly supported by a pair of small depending screws 21. A pair of shaped blocks 22 of non-magnetic material bridge the inwardly convergent angular ends of the respective pole pieces 17 and engage against core 20. The screws 21 which support the core extend through the upper block 22.

The shaping of pole pieces 17 as described directs the flux of the magnetic field thereof to the region of the air gap which is swept by armature 18, thus further strengthening the effective magnetic field. The shaping of blocks 22 as shown and direct mounting thereof on pole pieces 17 provides a unified assembly of increased rigidity, and at the same time improves the uniformity of the field.

A brass mounting plate 23 for certain parts of the relay, not particularly germane to the invention, is secured by studs 14 to the forward face of magnet unit 16. This plate also serves another function, to be described.

An elongated conducting contact arm or pointer 24 is suitably secured to the armature 18 or its shaft to swing with the latter. This arm is normally in the intermediate, neutral position indicated in dotted line in Fig. 1 when the relay is not energized, lying between a pair of magnetic contacts 25 positioned approximately 15° on either side of the central arm position. Current from an instrument or the like with which the relay is associated is supplied to arm 24 through a lead 26, conventionally shown in Figs. 1 and 2, and the contact circuit comprised of arm 24 and contacts 25 may, as in the case of the armature circuit, include a light control spring 27 also acting to center the arm, in known manner, lead 26 being connected to the spring. Suitable provisions are made for adjusting the torsion of the spring referred to but are not illustrated or further described inasmuch as they form no part of the invention.

Figure 2:
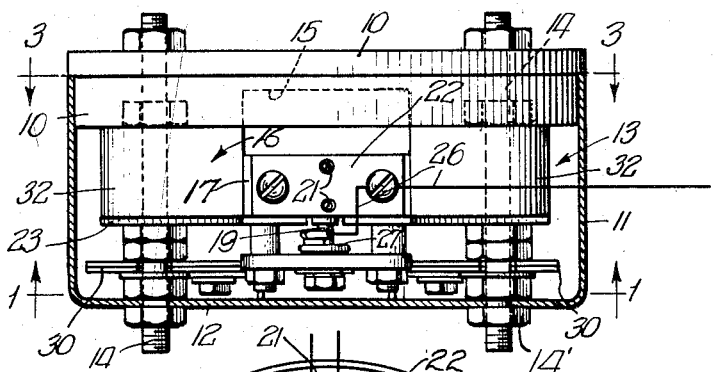
Fig. 2 is a top plan view with the casing sectioned along a medial horizontal plane.

When the coil of armature 18 is energized, it impels contact arm 24 to one side or other of the neutral position thereof, for example, to the position illustrated in solid line in Fig. 1 of the drawing. The arm is provided adjacent its free end with a small member 31 of magnetic conducting material; accordingly, upon the application of a minute electrical potential to the armature coil, the armature will be displaced from neutral position and, when only slightly displaced, will thereupon move rapidly under the pull of one or the adjacent contact magnets 25 into electrical contact therewith. Thus a control circuit is completed through one or the other of the leads 28 (Fig. 1) which are electrically connected through the adjustable conducting brackets 29 with the magnetic contacts 25.

Brackets 29 are screw mounted for horizontal adjustment on a relatively large plate-like shield 30 of high permeable material, which is in turn mounted in fixed relation to the remainder of the relay proper 13 by means of studs 14 and coacting nuts 14'. Shield 30 is composed of a plurality of steel sheets, or which two are shown in the illustrated embodiment. However, a greater number of shield sheets may be employed, if desired, to attain desired effectiveness of shielding. Shield 30 protects the field of magnet contacts 25 from the strong field of the permanent magnet unit 16. However, as pointed out above, a definite limitation on the permanent magnet strength is nevertheless still imposed, which cannot be exceeded without introducing a disturbance and interference with the relatively much weaker field. For this reason, and in order to use maximum permanent magnet effect, it has been the custom to design the various control or biasing springs, such as spring 27, to be extremely sensitive, with practically frictionless mounting and perfect balancing of the moving parts, all of which greatly increases the cost of manufacture of the instrument.

All of this is avoided by the present improvements. In accordance with the invention, magnet unit 16 is made up of two separate permanent magnets 32 of considerable mass, to each of which a pole piece 17 is secured, as through the agency of the brass plate 23 and other appropriate coacting mounting means. To complete the magnet structure a relatively massive bar 33 of highly permeable soft iron is bridged across the lower flat surfaces of the magnet members 32, remote from the pole pieces, and is secured in fixed, tightly contacting relation to those surfaces. This may be done through the agency of a pair of screws 34 engaging through brass mounting plate 23 into bridging bar 33.

The magnet 16 is rigidly clamped by studs 14 against the forward flat surface of the relatively massive mounting plate 10, and the same studs clamp the shielding and other provisions to the magnet. Thus the ruggedness of the instrument attributable to the functioning features described herein is furthered by the mechanical mounting provisions just referred to.

The bar 33 confines and localizes the magnetic field to the area behind magnetic shield 30, thus immunizing the field of magnetic contacts 25 from disturbance by the field of magnet unit 16. Contact arm 24 is accordingly swingable freely in response to the energization of armature 18, opposed solely by the springs which center the same. As a result, the need for delicate mounting provisions and exacting design of the springs and other parts is eliminated, with consequent great increase in the ruggedness and reliability of the instrument.

I claim:

1. A sensitive construction of the type described, comprising a primary magnet unit including permanent magnet means of substantial strength, an armature rotatable between pole pieces of said unit, a magnetic contact carrying arm secured to said armature for swinging movement therewith, magnetic contact holding means positioned for engagement by said arm, assisted by a secondary, relatively weak magnetic field between the arm and said contact holding means, upon rotation of said armature, and a shield of magnetic material interposed between said primary magnet unit and said contact holding means, said magnet unit comprising a pair of magnet members between which said armature rotates and a member of highly permeable magnetic material in bridging contact with the ends of said respective magnet members remote from said armature, said shield being fixedly positioned across said secondary field and between the same and said permeable bridging member to afford a shielded zone at the latter at which stray flux of said primary magnet unit is localized.

2. A sensitive construction of the type described, comprising a primary magnet unit including permanent magnet means of substantial strength, an armature rotatable between pole pieces of said unit, a magnetic contact carrying arm secured to said armature for swinging movement therewith, magnetic contact holding means positioned for engagement by said arm, assisted by a secondary, relatively weak magnetic field between the arm and said contact holding means, upon rotation of said armature, and a shield of magnetic material carrying said contact holding means interposed between said magnet unit and said contact holding means, said magnet unit comprising a pair of magnet members between which said armature rotates and a member of highly permeable magnetic material in bridging contact with the ends of said respective magnet members remote from said armature and on the side of said shield opposite said contact holding means, said shield being fixedly positioned across said secondary field and between the same and said permeable bridging member to afford a shielded zone at the latter at which stray flux of said primary magnet unit is localized.

3. A sensitive construction of the type described, comprising a pair of magnets having poles spaced from one another, a coil-wound armature rotatable in the space between said poles, a conducting contact arm secured to said armature for movement therewith and provided with an end contact portion of magnetic material, a fixed magnetic contact positioned for engagement by said contact arm upon electrical energization of said armature and under a secondary, relatively weak magnetic field between said contact portion and said fixed contact, a plate-like shield of magnetic material interposed between said magnets and said magnetic contact in shielding relation to the latter, and a member of highly permeable magnetic material bridging portions of said respective magnet members remote from the poles, said bridging member being in fixed contacting engagement with said last named portions on the side of said shield opposite said contact member, said shield being fixedly positioned across said secondary field and between the same and said permeable bridging member to afford a shielded zone at the latter at which stray flux of said primary magnet unit is localized.

4. A sensitive relay comprising means for sustaining a primary magnetic field including permanent magnet means of substantial strength, an armature rotatable in said primary field and having a movable contact carrying arm associated therewith, contact holding magnets constituting a secondary magnetic field of relatively weak strength as compared with said primary field, said arm adapted for movement into contact with said contact holding magnets and to be engaged thereby, and a magnetic shield interposed between said primary and secondary fields to reduce the effect of the former on the latter, said primary field having separate pole pieces between which said armature is movable, and a member of highly permeable magnetic material bridging said pole pieces at a point remote to their association with said armature, said member adapted to offer a path of low resistance to stray flux thereby aiding materially to localize the same out of contact with said secondary field, said shield being intermediate said member and said secondary field.

References Cited in the file of this patent

UNITED STATES PATENTS

| | | |
|---|---|---|
| 814,501 | Allen | Mar. 6, 1906 |
| 1,902,602 | Williams et al. | Mar. 21, 1933 |
| 2,262,504 | Lamb | Nov. 11, 1941 |
| 2,285,352 | Paulson | June 2, 1942 |
| 2,324,262 | Lamb | July 13, 1943 |
| 2,603,730 | Pethes | July 15, 1952 |

OTHER REFERENCES

Vol. I, Electrical Engineering, Direct Currents, by Dawes, 2nd ed., 7th impression (1927); page 16 relied upon.